United States Patent
Zhou et al.

(10) Patent No.: US 12,396,046 B2
(45) Date of Patent: Aug. 19, 2025

(54) MULTI-LINK COMMUNICATION METHOD AND RELATED APPARATUS

(71) Applicant: HUAWEI TECHNOLOGIES CO., LTD., Guangdong (CN)

(72) Inventors: Yifan Zhou, Shenzhen (CN); Yuchen Guo, Shenzhen (CN); Yunbo Li, Shenzhen (CN); Ming Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 306 days.

(21) Appl. No.: 17/572,461

(22) Filed: Jan. 10, 2022

(65) Prior Publication Data
US 2022/0338285 A1  Oct. 20, 2022

Related U.S. Application Data
(63) Continuation of application No. PCT/CN2020/100375, filed on Jul. 6, 2020.

(30) Foreign Application Priority Data
Jul. 12, 2019   (CN) ................. 201910634696.6

(51) Int. Cl.
*H04W 76/15*    (2018.01)
*H04W 8/24*     (2009.01)

(52) U.S. Cl.
CPC ............ *H04W 76/15* (2018.02); *H04W 8/24* (2013.01)

(58) Field of Classification Search
CPC ....... H04W 76/15; H04W 8/24; H04W 84/12; H04W 72/0446; H04W 74/0816; H04W 74/085; H04W 76/11
See application file for complete search history.

(56) References Cited

U.S. PATENT DOCUMENTS

2014/0146716 A1* 5/2014 Chen .................. H04L 5/16 370/277
2015/0288599 A1  10/2015 Zhou et al.
(Continued)

FOREIGN PATENT DOCUMENTS

| CN | 104067554 A | 9/2014 |
| CN | 104980988 A | 10/2015 |

(Continued)

OTHER PUBLICATIONS

Liwen Chu et al, Multiple Band Operation Discussion, May 14, 2019, IEEE 802.1119/0821r0, 11-19-0821-00-00, 7 pages.
(Continued)

*Primary Examiner* — Steven Hieu D Nguyen

(57) ABSTRACT

Embodiments provide a multi-link communication method and a related apparatus. A first station generates a radio frame, where the first station is one of a plurality of stations included in a first multi-link device. The first multi-link device includes a first station operating on a first link and a second station operating on a second link. The first station transmits the radio frame on the first link, where the radio frame includes capability indication information, and the capability indication information indicates whether the first station and the second station support simultaneous transmitting/receiving operations. According to the embodiments of this application, communication quality can be ensured.

26 Claims, 9 Drawing Sheets

(56) References Cited

U.S. PATENT DOCUMENTS

| | | | |
|---|---|---|---|
| 2017/0171060 A1 | 6/2017 | Liu et al. | |
| 2019/0082373 A1* | 3/2019 | Patil | H04L 1/1614 |
| 2019/0268956 A1* | 8/2019 | Xiao | H04W 76/15 |
| 2019/0335454 A1* | 10/2019 | Huang | H04W 72/542 |

FOREIGN PATENT DOCUMENTS

| | | |
|---|---|---|
| CN | 105556909 A | 5/2016 |
| CN | 109600856 A | 4/2019 |
| CN | 111385828 A | 7/2020 |
| JP | 7507846 B2 | 6/2024 |

OTHER PUBLICATIONS

Yunbo Li (Huawei): "channel access in multi-band operation", IEEE Draft; 11-19-1116-00-00BE-Channel-Access-in-Multi-Bandoperation, IEEE-SA Mentor, Piscataway, NJ USAvol. 802.11 EHT; 802.11 be Jul. 10, 2019 (Jul. 10, 2019), pp. 1-16,XP068152826, Retrieved from the Internet:URL:https://mentor.ieee.org/802.11 / dcn/19/11-19-1116-00-00be-channelaccess-in-multi-band-operation. pptx[retrieved on Jul. 10, 2019].

IEEE Std 802.11-2016, IEEE Standard for Information technology Telecommunications and information exchange between systems Local and metropolitan area networks Specific requirements, Part 11: Wireless LAN Medium Access Control (MAC) and Physical Layer (PHY) Specifications, IEEE Computer Society, Dec. 2016, 3534 pages.

Laurent Cariou, CR for 6GHz—Discovery, IEEE P802.11 Wireless LANs, doc.: IEEE 802.11-18/1227r0, 7 pages.

Po-Kai Huang (Intel): "Extremely Efficient Multi-band Operation", IEEE Draft; 11-19-0822-00-00BE-Extremely-Efficient-Mul Tiband-Operation, IEEE-SA Mentor, Piscataway, NJ USAvol. 802.11 EHT; 802.11 be May 12, 2019 (My 12, 2019), pp. 1-25,XP068151259, Retrieved from the Internet: U RL:https://mentor.ieee.org/802.11 /dcn/19/11-19-0822-00-00be-extremelyefficient-multi-band-operation. pptx[retrieved on May 12, 2019].

"IEEE P802.11ax /D4.0, Feb. 2019, Draft Standard for Information technology Telecommunications and Information exchange between systems Local and metropolitan area networks Specific requirements Part 11: Wireless LAN Medium Access Control (MAC) and Physical Layer (PHY) Specifications Amendment 6: Enhancements for High Efficiency WLAN, 746 pages".

IEEE P802.11-REVmd /D2.0, Dec. 2018, IEEE P802.11-REVmdTM/ D2.0, Dec. 2018 Draft Standard for Information technology Telecommunications and information exchange between systems Local and metropolitan area networks Specific requirements, Part 11: Wireless LAN Medium Access Control (MAC) and Physical Layer (PHY) Specifications Prepared by the 802.11 Working Group of the LAN/MAN Standards Committee of the IEEE Computer Society, 4601 pages.

P802.11be, 11-19-0244-00-0eht-eht-par-document, Standard for Information technology—Telecommunications and Information exchange between systems Local and metropolitan area networks—Specific requirements—Part 11: Wireless LAN Medium Access Control (MAC) and Physical Layer (PHY) Specifications Amendment: Enhancements for Extremely High Throughput (EHT), 3 pages.

Abhishek Patil et al., Multi-Link Operation: Design Discussion, , May 2, 2019, IEEE 802.11-19/0823r0, 11 pages.

Nokia Corporation et al: "TDD/FDD joint operation and RAN2aspects",3GPP Draft; R2-141111 (TDD FDD Joint Operation and RAN2ASPECTS), 3rd Generation Partnership Project (3GPP),Mobile Competence Centre;650, Route Des Lucioles;F-06921 Sophia-Antipolis Cedex;Franvol. RAN. WG2, No. Valencia, Spain;Mar. 31, 2014-Apr. 4, 2014 Mar. 22, 2014(Mar. 22, 2014), XP050792370, Retrieved from the Internet: URL:http://www.3gpp. org/ftp/Meetings_ 3GPP-YNC/RAN2/Docs/[retrieved on Mar. 22, 2014].

* cited by examiner

Access point device

Station device

| Element ID | Length | Multi-band control | Band ID | Operating class | Channel number | BSSID | Beacon interval |
|---|---|---|---|---|---|---|---|

| TSF offset | Multi-band connection capability | FST session timeout | STA MAC address | Pairwise cipher suite count | Pairwise cipher suite list |
|---|---|---|---|---|---|

FIG. 5

MULTI-LINK COMMUNICATION METHOD AND RELATED APPARATUS

CROSS-REFERENCE TO RELATED APPLICATIONS

This application is a continuation of International Application No. PCT/CN2020/100375, filed on Jul. 6, 2020, which claims priority to Chinese Patent Application No. 201910634696.6, filed on Jul. 12, 2019. The disclosures of the aforementioned applications are hereby incorporated by reference in their entireties.

TECHNICAL FIELD

This application relates to the field of communication technologies, and in particular, to a multi-link communication method and a related apparatus.

BACKGROUND

With development of wireless technologies, a multi-link device can support multi-link communication, for example, perform communication on a 2.4 GHz frequency band, a 5 GHz frequency band, and a 60 GHz frequency band at the same time. The multi-link device may perform switching between different frequency bands even if there is a limited quantity of antennas, to select an optimal frequency band to ensure communication quality. As more application traffic is carried by a wireless network, a wireless-fidelity (Wi-Fi) system evolves toward a goal of a high transmission rate. To increase a peak rate of a station in the multi-link device, multi-link aggregation communication has become an additional feature of a next-generation wireless local area network (WLAN) technology. The multi-link aggregation communication involves coordination between a plurality of links, but the plurality of links is mutually restricted. For example, it is difficult for a radio transceiver unit to support a full-duplex operation. If data is simultaneously transmitted and received on two links that do not support simultaneous transmitting/receiving operations, communication quality cannot be ensured.

SUMMARY

Embodiments provide a multi-link communication method and a related apparatus, to ensure communication quality.

According to a first aspect, an embodiment provides a multi-link communication method. The method includes: A first station generates a radio frame, where the first station is one of a plurality of stations included in a first multi-link device, the first multi-link device includes a first station operating on a first link and a second station operating on a second link; and the first station transmits the radio frame on the first link, where the radio frame includes capability indication information, and the capability indication information is used to indicate whether the first station and the second station support simultaneous transmitting/receiving operations. The capability indication information is carried in the radio frame to indicate whether the first station operating on the first link and the second station operating on the second link in the first multi-link device support simultaneous transmitting/receiving operations. Another (third) station that receives the capability indication information can determine whether the first station and the second station in the first multi-link device can support simultaneous transmitting/receiving of data. If the first station and the second station support simultaneous transmitting/receiving of data, the third station may perform simultaneous transmitting/receiving with the first station and the second station, thereby improving communication efficiency. If the first station and the second station do not support simultaneous transmitting/receiving of data, the third station may avoid performing simultaneous transmitting/receiving with the first station and the second station, thereby ensuring communication quality.

Whether the first station and the second station support simultaneous transmitting/receiving operations may also be understood as: A multi-link device does not support simultaneous transmitting/receiving operations on the first link and the second link. That a multi-link device does not support simultaneous transmitting/receiving operations on the first link and the second link includes: The multi-link device does not support that the first station transmits a first-bandwidth physical layer protocol data unit PPDU on the first link while the second station receives a second-bandwidth physical layer protocol data unit PPDU on the second link, or that the first station receives a first-bandwidth physical layer protocol data unit on the first link while the second station transmits a second-bandwidth physical layer protocol data unit on the second link. In this embodiment, "simultaneous transmitting/receiving" or "simultaneous" does not mean that a start time point and an end time point of transmitted data are strictly the same as a start time point and an end time point of received data respectively, and may mean that there is a non-empty intersection between the first-bandwidth PPDU and the second-bandwidth PPDU in terms of time.

According to a second aspect, an embodiment provides a multi-link communication method. The method includes: A third station receives a radio frame transmitted by a first station of a plurality of stations included in a first multi-link device, where the first multi-link device includes a first station operating on a first link and a second station operating on a second link, the radio frame includes capability indication information, and the capability indication information indicates whether the first station and the second station support simultaneous transmitting/receiving operations. The third station determines, based on the capability indication information, whether the first station and the second station support simultaneous transmitting/receiving operations. The third station that receives the capability indication information can determine whether the first station and the second station in the first multi-link device can support simultaneous transmitting/receiving of data. If the first station and the second station support simultaneous transmitting/receiving of data, the third station may perform simultaneous transmitting/receiving with the first station and the second station, thereby improving communication efficiency. If the first station and the second station do not support simultaneous transmitting/receiving of data, the third station may avoid performing simultaneous transmitting/receiving with the first station and the second station, thereby ensuring communication quality.

In a possible design of the first or second aspect, the capability indication information includes first indication information, and the first indication information indicates whether the first station and the second station support simultaneous transmitting/receiving operations.

In another possible design of the first or second aspect, the simultaneous transmitting/receiving operations include a first operation and a second operation. The first operation provides that the second station performs a receiving operation while the first station performs a transmitting operation, and the second operation provides that the second station performs a transmitting operation while the first station performs a receiving operation. The first indication information includes 1-bit information indicating whether both the first station and the second station support the first operation and the second operation.

In another possible design of the first or second aspect, the simultaneous transmitting/receiving operations include a first operation and a second operation. The first operation provides that the second station performs a receiving operation while the first station performs a transmitting operation, and the second operation provides that the second station performs a transmitting operation while the first station performs a receiving operation. The first indication information includes 2-bit information. First-bit information in the 2-bit information indicates whether the first station and the second station support the first operation, and second-bit information in the 2-bit information indicates whether the first station and the second station support the second operation.

In another possible design of the first or second aspect, the first indication information includes a plurality of pieces of 1-bit information or 2-bit information. One piece of 1-bit information or one piece of 2-bit information indicates whether the first station using a first bandwidth and the second station using a second bandwidth support simultaneous transmitting/receiving operations. This implements that the first station and the second station use different bandwidths to perform simultaneous transmitting/receiving operations.

In another possible design of the first or second aspect, the capability indication information includes second indication information. The second indication information includes a threshold that indicates a minimum value of a difference between operating frequencies of two links that support the simultaneous transmitting/receiving operations. The third station may determine whether the first station and the second station support simultaneous transmitting/receiving operations based on the threshold.

In another possible design of the first aspect or second aspect, the capability indication information includes first indication information and second indication information. The second indication information includes a threshold. The first indication information indicates whether the first station and the second station support simultaneous transmitting/receiving operations when a difference between an operating frequency of the first station and an operating frequency of the second station is greater than the threshold. Based on joint indication of the first indication information and the second indication information, simultaneous transmitting/receiving operations are performed when both the first indication information and the second indication information are met.

In another possible design of the first or second aspect, the first multi-link device includes at least one multi-link logical entity. The multi-link logical entity includes at least one station. The capability indication information includes third indication information, and the third indication information is used to indicate whether the first station and the second station are located in a same multi-link logical entity. When the first station and the second station are located in a same multi-link logical entity, data frames of a same service type may be transmitted in a multi-link aggregation communication manner.

In another possible design of the first or second aspect, the radio frame includes an information element. The capability indication information is carried in the information element. The information element includes identification information of the second link. The information element includes a multi-band element, a reduced neighbor report element, or a neighbor report element.

In another possible design of the first or second aspect, the radio frame includes a transmitting/receiving capability information element. The transmitting/receiving capability information element includes an element ID, an element length, and the capability indication information. The capability indication information includes a link identifier of the first link and a link identifier of the second link. Whether the first station operating on the first link and any station operating on another link in the first multi-link device support simultaneous transmitting/receiving operations can be indicated by using the transmitting/receiving capability information element, without a need to be indicated by using information elements one by one. This reduces signaling overheads.

According to a third aspect, an embodiment provides a multi-link communication method. The method includes: A first multi-link device receives on a primary link a physical protocol data unit PPDU transmitted by a second multi-link device, there being a plurality of links between the first multi-link device and the second multi-link device, and the plurality of links includes the primary link and a secondary link adjacent to the primary link; and the first multi-link device sets a transmitting "block out" ("forbidden") time, where the transmitting block-out time indicates a period of time in which a station operating on the secondary link in the first multi-link device is prevented from transmitting data. In multi-link aggregation (aggregation between the primary link and the secondary link) communication, data is prevented from being transmitted on the secondary link by setting the transmitting "block-out" time, to avoid simultaneous transmitting/receiving of data on adjacent links. This reduces interference and contention conflicts for the primary link.

In a possible design, transmitting the block-out time includes a start time point and an end time point.

In another possible design, transmitting the block-out time includes a start time point and a time length.

In another possible design, the start time point is a time point at which a signaling field in a physical layer preamble is obtained, a time point at which that a receive address in a media access control MAC frame header in a PPDU matches an address of a station operating on the primary link is determined, or a time point at which a frame check sequence FCS is received and that a data packet is received correctly is determined. Optionally, "obtaining" may also be construed as receiving, detecting, or parsing. The end time point is an end time point of a PPDU, an end time point of a block acknowledgment BA in response to a PPDU, a time point of a BA in response to a PPDU plus a short interframe space SIFS, or an end time point of a transmission opportunity TXOP to which a PPDU belongs. Optionally, a time point may also be referred to as a moment. In another possible design, when a secondary link is adjacent to a plurality of primary links, the start time point is a smallest start value of a plurality of transmitting block-out times corresponding to the plurality of primary links, and the end time point is a largest end value of the plurality of transmitting block-out times corresponding to the plurality of primary links. Therefore, it is ensured that the transmitting block-out time set for the secondary link can meet requirements of the plurality of primary links, and no interference or no contention conflict is caused to all the primary links.

In another possible design, when a secondary link is adjacent to the plurality of primary links, the time length is a largest value of a plurality of time lengths corresponding to the plurality of primary links. Therefore, it is ensured that the transmitting block-out time set for the secondary link can meet requirements of the plurality of primary links, and no interference or no contention conflict is caused to all the primary links.

In another possible design, when a secondary link is adjacent to a plurality of primary links, transmitting block-out time may be set for each of the primary links in the foregoing manner of setting a start time point and an end time point, and the plurality of transmitting block-out time is recorded on the secondary link.

According to a fourth aspect, an embodiment provides a first multi-link device. The first multi-link device is configured to implement the methods and the functions performed by the first multi-link device in the first aspect and the third aspect, and is implemented by hardware/software. The hardware/software includes modules corresponding to the foregoing functions.

According to a fifth aspect, an embodiment provides a second multi-link device. The second multi-link device is configured to implement the method and the functions performed by the second multi-link device in the second aspect, and is implemented by hardware/software. The hardware/software includes modules corresponding to the foregoing functions.

According to a sixth aspect, an embodiment provides a first multi-link device, including a processor, a memory, and a communication bus. The communication bus is configured to implement connections and communication between the processor and the memory. The processor executes a program stored in the memory to implement the steps in the first aspect and the third aspect.

In a possible design, the first multi-link device provided in this application may include corresponding modules configured to execute actions of the first multi-link device in the foregoing method designs. The modules may be software and/or hardware.

According to a seventh aspect, an embodiment provides a second multi-link device, including a processor, a memory, and a communication bus. The communication bus is configured to implement connections and communication between the processor and the memory. The processor executes a program stored in the memory to implement the steps in the second aspect.

In a possible design, the second multi-link device provided may include corresponding modules configured to execute actions of the second multi-link device in the foregoing method designs. The modules may be software and/or hardware.

According to an eighth aspect, this disclosure provides a computer-readable storage medium that stores instructions. When the instructions are run on a computer, the computer is enabled to perform the method in any one of the foregoing aspects.

According to a ninth aspect, this disclosure provides a computer program product including instructions. When the computer program product runs on a computer, the computer is enabled to perform the method in any one of the foregoing aspects.

According to a tenth aspect, a chip is provided, including a processor. The chip is configured to invoke instructions from a memory and run instructions stored in the memory, so that a communication device in which the chip is installed performs the method in any one of the foregoing aspects.

According to an eleventh aspect, an embodiment provides a second chip. The second chip may be included in a first multi-link device or a second multi-link device. The second chip includes an input interface, an output interface, and a processing circuit. The input interface, the output interface, and the circuit are connected through an internal connection path. The processing circuit is configured to perform the method in any one of the foregoing aspects.

According to a twelfth aspect, a third chip is provided, including an input interface, an output interface, and a processor. Optionally, the third chip further includes a memory. The input interface, the output interface, the processor, and the memory are connected through an internal connection path. The processor is configured to execute code in the memory. When the code is executed, the processor is configured to perform the method in any one of the foregoing aspects.

According to a thirteenth aspect, an apparatus is provided. The apparatus is configured to implement the method in any one of the foregoing aspects.

BRIEF DESCRIPTION OF DRAWINGS

To describe the technical solutions in the embodiments of this application more clearly, the following describes the accompanying drawings for describing the embodiments of this application.

FIG. 5 is a schematic diagram of other fields included in a multi-link element according to an embodiment;

DESCRIPTION OF EMBODIMENTS

The following describes the embodiments with reference to the accompanying drawings.

Figure 1:
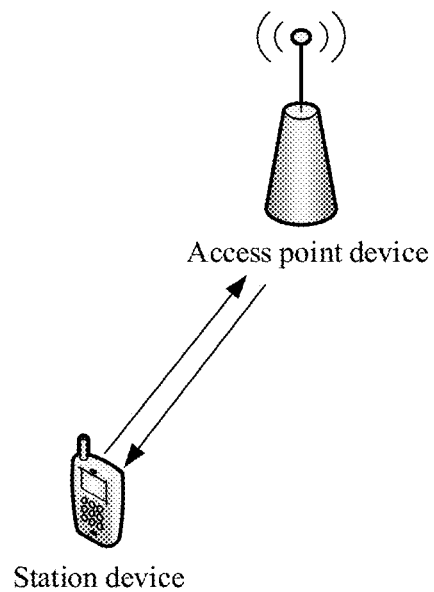
FIG. 1 is a schematic architectural diagram of a communication system according to an embodiment.

FIG. 1 is a schematic architectural diagram of a communication system according to an embodiment of this disclosure. The communication system includes an access point device and a station device. A multi-link device in this embodiment may be a station device, or may be an access point device. If the multi-link device is an access point device, the multi-link device includes one or more access points (AP). If the multi-link device is a station device, the multi-link device includes one or more stations (STA). The architecture may also be extensively used in an application scenario in which a base station (BS) and a terminal device (UE) are included. The AP may be an access point used for a mobile user to access a wired network. The AP is mainly deployed inside a house, a building, and a campus, with a typical coverage radius of tens of meters to hundreds of meters. Certainly, the AP may alternatively be deployed outdoors. The AP is equivalent to a bridge that connects the wired network and a wireless network. The AP is mainly used to connect wireless network clients to each other, and then connect the wireless network to the Ethernet. The AP may be a terminal device or network device with a Wi-Fi chip. The AP may be a device that supports the 802.11ax standard. Alternatively, the AP may be a device that supports a plurality of wireless local area network (WLAN) standards such as 802.11ac, 802.11n, 802.11g, 802.11b, and 802.11a. The STA may be a wireless communication chip, a wireless sensor, or a wireless communication terminal. For example, the STA may be a mobile phone that supports a Wi-Fi communication function, a tablet computer that supports a Wi-Fi communication function, a set-top box that supports a Wi-Fi communication function, a smart television that supports a Wi-Fi communication function, a smart wearable device that supports a Wi-Fi communication function, a vehicle-mounted communication device that supports a Wi-Fi communication function, or a computer that supports a Wi-Fi communication function. Optionally, the STA may support the 802.11ax standard. The STA may also support a plurality of WLAN standards such as 802.11ac, 802.11n, 802.11g, 802.11b, and 802.11a.

Figure 2:
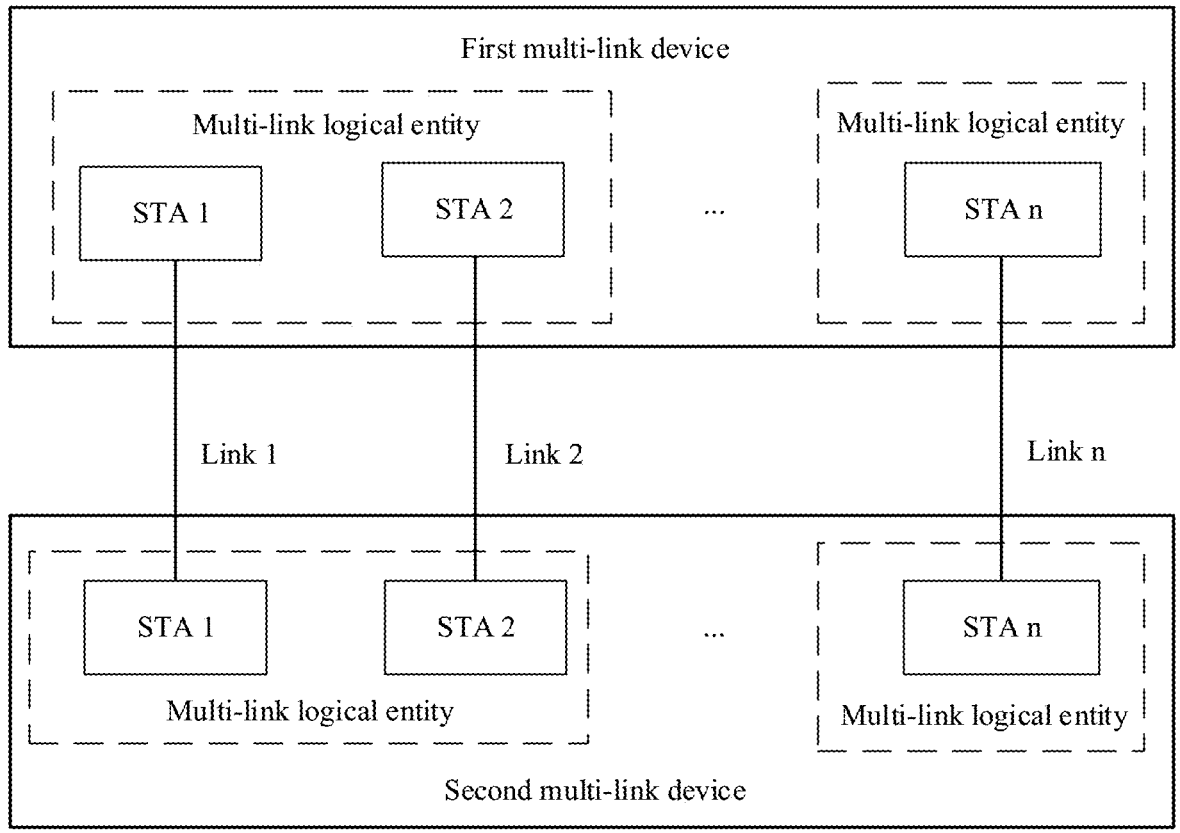
FIG. 2 is a schematic diagram of association relationships between multi-link devices according to an embodiment.

FIG. 2 is a schematic diagram of association relationships between multi-link devices according to an embodiment of this application. The multi-link devices shown in FIG. 2 include a first multi-link device and a second multi-link device. The first multi-link device or the second multi-link device each may include at least one multi-link logical entity. One multi-link logical entity may include one or more stations, and all the stations operate on different links. A STA 1 and a STA 2 in the first multi-link device belong to a multi-link logical entity, and a STA n in the first multi-link device belongs to another multi-link logical entity. A STA 1 and a STA 2 in the second multi-link device belong to a multi-link logical entity, and a STA n in the second multi-link device belongs to another multi-link logical entity. If the first multi-link device communicate with the second multi-link device, each station in the first multi-link device associated with a corresponding station in the second multi-link device. As shown in FIG. 2, the STA 1 in the first multi-link device is associated with the STA 1 in the second multi-link device, and operates on a link 1. The STA 2 in the first multi-link device is associated with the STA 2 in the second multi-link device, and operates on a link 2. The STA n in the first multi-link device is associated with the STA n in the second multi-link device, and operates on a link n. In this way, each station in the first multi-link device may establish a connection to the corresponding station in the second multi-link device on a respective link, thereby implementing multi-link communication between the two multi-link devices.

As more application traffic is carried by a wireless network, a Wi-Fi system evolves toward a goal of a high rate transmission. Multi-link aggregation communication has become an alternative feature of a next-generation WLAN technology, to increase a peak transmission rate of a station in the multi-link device. The multi-link aggregation communication involves coordinated work between a plurality of links, but there are mutual restrictions between links. For example, it is difficult for a radio transceiver unit to support a full-duplex operation currently. Two links that are close to each other cannot implement simultaneous transmitting/receiving operations, while two links that are far away from each other can implement simultaneous transmitting/receiving operations. However, simultaneous transmitting/receiving capabilities of each link are not indicated in a conventional solution. This affects communication efficiency. If data is simultaneously transmitted and received on two links that do not support simultaneous transmitting/receiving operations, communication quality cannot be ensured. In addition, there is a primary link and a secondary link in multi-link transmission. When the primary link and the secondary link do not support simultaneous transmitting/receiving operations, the secondary link cannot transmit data while the primary link is receiving a data packet. However, because the secondary link itself does not perform backoff, the secondary link is transmitted only along with another primary link. This may cause interference and contention conflicts to data transmission on the primary link. To resolve the foregoing technical problem, the embodiments of this application provide the following solutions.

Figure 3:
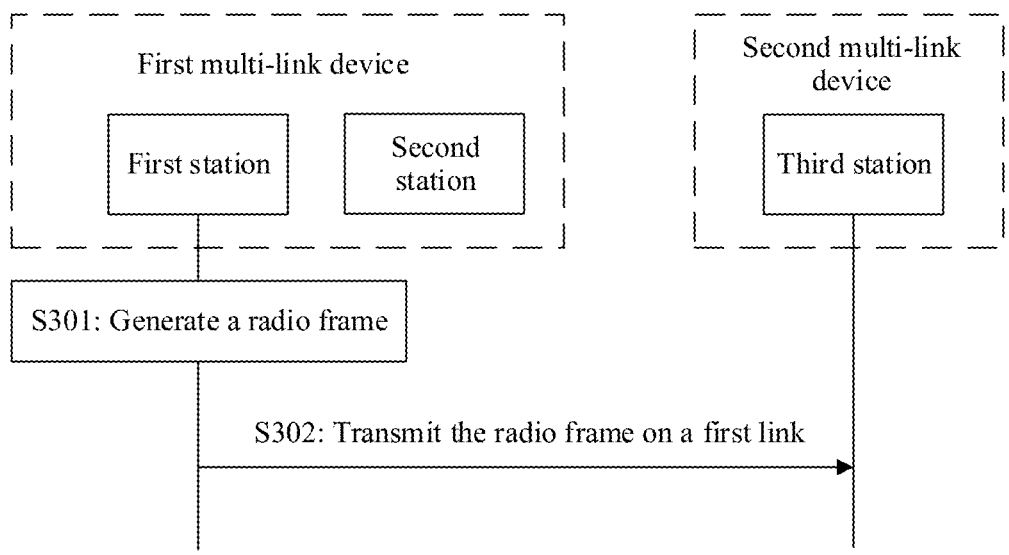
FIG. 3 is a schematic flowchart of a multi-link communication method according to an embodiment.

FIG. 3 is a schematic flowchart of a multi-link communication method according to an embodiment. The method includes but is not limited to the following steps.

S301: A first station generates a radio frame, where the first station is one of a plurality of stations included in a first multi-link device, and the first multi-link device includes the first station operating on a first link and a second station operating on a second link.

It should be noted that a link is determined based on an operating frequency band of a station, or the operating frequency band and a channel of the station. A frequency band may include a plurality of channels. If a plurality of stations operate on different frequency bands, the plurality of stations operate on different links. Alternatively, if the plurality of stations operate on a same frequency band but different channels, the plurality of stations also operate on different links.

The first station and the second station each may be a non-AP STA, or may be an AP-STA. If both the first station and the second station are non-AP STAs, the radio frame may be a probe request frame, an authentication frame, an association request frame, or a re-association request frame. If both the first station and the second station are AP STAs, the radio frame may be a beacon frame, a probe response frame, an association response frame, an authentication frame, or a re-association response frame.

S302: The first station transmits the radio frame on the first link, and a third station in a second multi-link device receives the radio frame transmitted by the first station in the plurality of stations included in the first multi-link device, where the radio frame includes capability indication information, the capability indication information indicates whether the first station and the second station support simultaneous transmitting/receiving operations, the third station in the second multi-link device may determine, based on the capability indication information, whether the first station and the second station support simultaneous transmitting/receiving operations.

It should be noted that the third station may be not a station in a multi-link device, but may operate on a single link. For example, the third station is a station operating on the first link.

Optionally, the capability indication information includes first indication information, and the first indication information indicates whether the first station and the second station support simultaneous transmitting/receiving operations.

The simultaneous transmitting/receiving operations include a first operation and a second operation, where the first operation provides that the second station performs a receiving operation while the first station performs a transmitting operation, and the second operation provides that the second station performs a transmitting operation while the first station performs a receiving operation. The first operation may alternatively be that the second station performs a transmitting operation while the first station performs a receiving operation, and the second operation may alternatively be that the second station performs a receiving operation while the first station performs a transmitting operation. This is not limited herein. The first indication information includes 1-bit information, and the 1-bit information indicates whether both the first station and the second station support the first operation and the second operation.

For example, the 1-bit information in the first indication information may be 0 or 1. If the 1-bit information is 1, it may indicate that both the first station and the second station support the first operation and the second operation. If the 1-bit information is 0, it indicates that neither the first station nor the second station supports both the first operation and the second operation. Functions indicated by 0 and 1 may alternatively be interchangeable. This is not limited herein.

The simultaneous transmitting/receiving operations include a first operation and a second operation. The first operation is that the second station performs a receiving operation while the first station performs a transmitting operation, and the second operation is that the second station performs a transmitting operation while the first station performs a receiving operation. Alternatively, the first operation may be that the second station performs a transmitting operation while the first station performs a receiving operation, and the second operation may be that the second station performs a receiving operation while the first station performs a transmitting operation. This is not limited herein. The first indication information includes 2-bit information, first-bit information in the 2-bit information indicates whether the first station and the second station support the first operation, and second-bit information in the 2-bit information indicates whether the first station and the second station support the second operation.

For example, the 2-bit information may include 00, 10, 01, or 11. 00 may indicate that neither the first station nor the second station supports the first operation and the second operation. 10 may indicate that the first station and the second station support the first operation but do not support the second operation. 01 may indicate that the first station and the second station do not support the first operation but support the second operation. 11 may indicate that both the first station and the second station support the first operation and support the second operation. Functions indicated by 0 and 1 may alternatively be interchangeable. This is not limited herein.

Optionally, the first indication information includes a plurality of pieces of 1-bit information or a plurality of pieces of 2-bit information. One piece of 1-bit information or one piece of 2-bit information is used to indicate whether the first station using a first bandwidth and the second station using a second bandwidth support simultaneous transmitting/receiving operations. The first bandwidth is a bandwidth at which the first station transmits data, and may include but is not limited to 20 MHz, 40 MHz, 80 MHz, 160 MHz, or 320 MHz. The second bandwidth is a bandwidth at which the second station transmits data, and may include but is not limited to 20 MHz, 40 MHz, 80 MHz, 160 MHz, or 320 MHz.

For example, the first station may transmit data at a bandwidth of 20 MHz, 40 MHz, or 80 MHz, and the second station may transmit data at a bandwidth of 80 MHz or 160 MHz. There are the following six channel bandwidth configurations for the first station and the second station. The first station transmits data at a bandwidth of 20 MHz, and the second station transmits data at a bandwidth of 80 MHz. Alternatively, the first station transmits data at a bandwidth of 20 MHz, and the second station transmits data at a bandwidth of 160 MHz. Alternatively, the first station transmits data at a bandwidth of 40 MHz, and the second station transmits data at a bandwidth of 80 MHz. Alternatively, the first station transmits data at a bandwidth of 40 MHz, and the second station transmits data at a bandwidth of 160 MHz. Alternatively, the first station transmits data at a bandwidth of 80 MHz, and the second station transmits data at a bandwidth of 80 MHz. Alternatively, the first station transmits data at a bandwidth of 80 MHz, and the second station transmits data at a bandwidth of 160 MHz. The foregoing six channel bandwidth configurations may be indicated by using six 1 bits or six 2bits. For example, the foregoing six channel bandwidth configurations may be indicated by using six 1 bits. If the first indication information is 100000, it may indicate that simultaneous transmitting/receiving operations performed by using the first channel bandwidth configuration are supported. The first station uses the bandwidth of 20 MHz to receive (or transmit) data, and that the second station uses the bandwidth of 80 MHz to transmit (or receive) data. If the first indication information is 001000, it may indicate that simultaneous transmitting/receiving operations performed by using the third channel bandwidth configuration are supported. The first station uses the bandwidth of 40 MHz to receive (or transmit) data, and that the second station uses the bandwidth of 80 MHz to transmit (or receive) data. The other channel bandwidth configurations are similar. Details are not described in this embodiment.

Optionally, the capability indication information may include second indication information. The second indication information includes a threshold. The threshold indicates a minimum value of a difference between operating frequencies of two links that support simultaneous transmitting/receiving operations. After receiving the radio frame, the third station in the second multi-link device obtains an information element in the radio frame, where the information element includes identification information of the second link. The third node may determine, based on the identification information of the second link, an operating frequency of the second station that operates on the second link in the first multi-link device. The third node compares the operating frequency of the second station with an operating frequency of the first station that transmits the radio frame, to determine a difference between the operating frequency of the first station and the operating frequency of the second station. If the difference between the operating frequency of the first station and the operating frequency of the second station is greater than (or greater than or equal to)

the threshold, the third station in the second multi-link device may determine that the first station and the second station in the first multi-link device support simultaneous transmitting/receiving operations. If the difference between the operating frequency of the first station and the operating frequency of the second station is less than or equal to (or less than) the threshold, the third station in the second multi-link device may determine that the first station and the second station in the first multi-link device do not support simultaneous transmitting/receiving operations. The threshold may be measured in a bandwidth width, for example, 5 MHz or 20 MHz.

Optionally, the capability indication information may include first indication information and second indication information. The second indication information includes a threshold. The first indication information is used to indicate whether the first station and the second station support simultaneous transmitting/receiving operations when a difference between an operating frequency of the first station and an operating frequency of the second station is greater than the threshold. Further, after receiving the radio frame, if the third station in the second multi-link device determines that the difference between the operating frequency of the first station and the operating frequency of the second station is greater than (or greater than or equal to) the threshold, and determines, based on the first indication information, that the first station and the second station support simultaneous transmitting/receiving operations, the third station may determine that the first station and the second station support simultaneous transmitting/receiving operations. Alternatively, if the third station determines that the difference between the operating frequency of the first station and the operating frequency of the second station is greater than (or greater than or equal to) the threshold, but determines, based on the first indication information, that the first station and the second station do not support simultaneous transmitting/receiving operations, the third station may determine that the first station and the second station do not support simultaneous transmitting/receiving operations. If the third station determines that the difference between the operating frequency of the first station and the operating frequency of the second station is less than or equal to the threshold, regardless of whether the first indication information indicates simultaneous transmitting/receiving operations are supported or not, the third station determines that the first station and the second station do not support simultaneous transmitting/receiving operations. Optionally, the first indication information is set to a reserved value.

Optionally, the first multi-link device includes at least one multi-link logical entity (MLO entity). The multi-link logical entity includes at least one station. The capability indication information includes third indication information. The third indication information is used to indicate whether the first station and the second station are located in a same multi-link logical entity. Further, if the first station and the second station are located in a same MLO entity, the first station and the second station may transmit data frames of a same service type (traffic ID, TID) in a multi-link aggregation communication manner. If the first station and the second station are located in different MLO entities, the first station and the second station may transmit data frames in a multi-link aggregation communication manner, where the data frames are data frames of different service types.

Optionally, the radio frame includes an information element. The capability indication information is carried in the information element. The information element includes identification information of the second link. The information element may be a multi-band element, a reduced neighbor report element (RNR element), or a neighbor report element. The multi-band element may indicate a link on which the second station operates. The RNR element and the neighbor report element may be used to indicate a neighbor node probed by the first station, and are used to carry information about the probed neighbor node. The neighbor node may be a station other than the first station of the first multi-link device, that is, the second station. One or more of the first indication information, the second indication information, and the third indication information may be carried in the multi-band element, the RNR element, or the neighbor report element.

Figure 4:
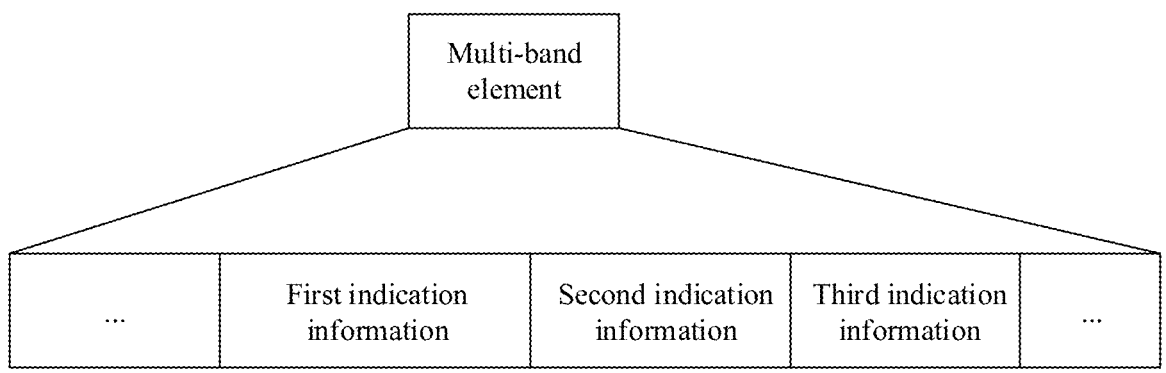
FIG. 4 is a schematic diagram of a multi-band element according to an embodiment.

For example, FIG. 4 is a schematic diagram of a multi-band element according to an embodiment of this application. The multi-band element may include one or more of a first indication information field, a second indication information field, and a third indication information field. Quantities of bits of the first indication information field, the second indication information field, and the third indication information field are not limited, and locations of the first indication information field, the second indication information field, and the third indication information field are not limited either. The quantity of bits may be 1 or 2. Optionally, the multi-band element may further include other fields. Optionally, a part represented by ellipses in FIG. 4 may include a plurality of fields shown in FIG. 5. The plurality of fields may include a band ID field, a channel number field, and an operating class field. The band ID field, the channel number field, and the operating class field may indicate the second link on which the second station operates. Optionally, the plurality of fields may further include an element ID field, a length field, a multi-band control field, a beacon interval field, a multi-band connection capability field, a STA MAC address field, and the like. The locations of the first indication information field, the second indication information field, the third indication information field, and locations of the plurality of fields shown in FIG. 5 in the multi-band element are not limited.

Figure 6:
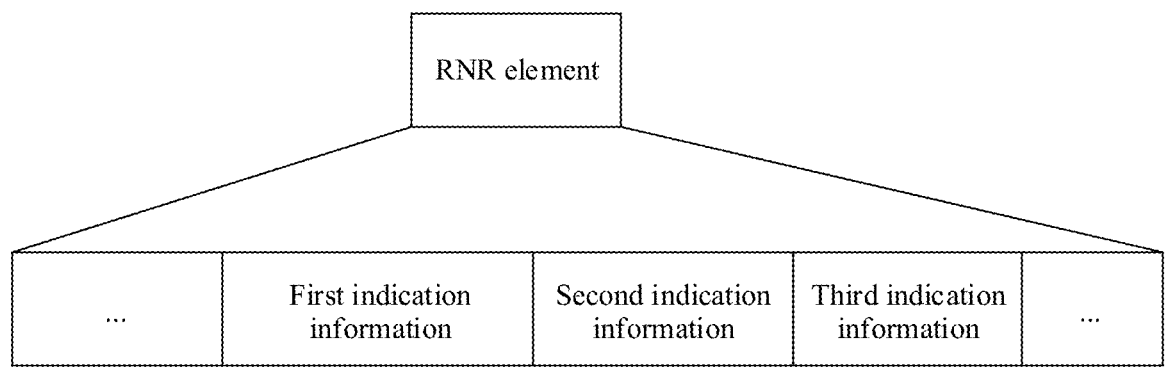
FIG. 6 is a schematic diagram of a reduced neighbor report element according to an embodiment.
Figure 7:
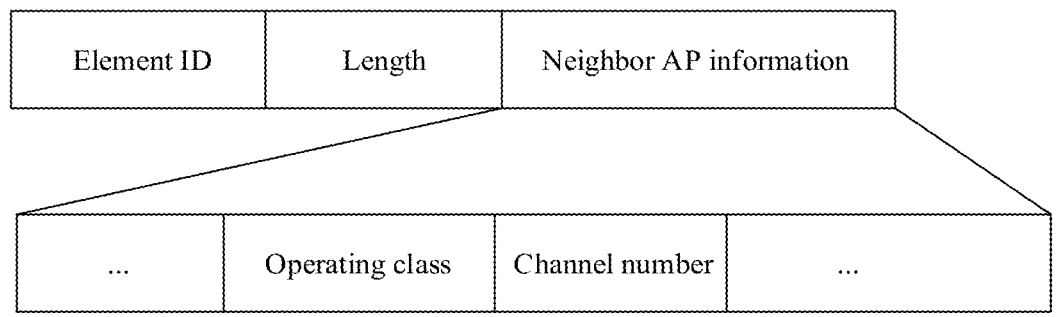
FIG. 7 is a schematic diagram of other fields included in a reduced neighbor report element according to an embodiment.

FIG. 6 is a schematic diagram of a reduced neighbor report element RNR element according to an embodiment of this application. The RNR element may include one or more of a first indication information field, a second indication information field, and a third indication information field. Quantities of bits of the first indication information field, the second indication information field, and the third indication information field are not limited, and locations of the first indication information field, the second indication information field, and the third indication information field are not limited either. The quantity of bits may be 1 or 2. Optionally, the RNR element may further include other fields. Optionally, a part represented by ellipses in FIG. 6 may include a plurality of fields shown in FIG. 7. The plurality of fields may include a neighbor AP information field, and the neighbor AP information field may further include a channel number field and an operating class field. Optionally, the plurality of fields may further include an element ID field, a length field, and the like. The locations of the first indication information field, the second indication information field, the third indication information field, and locations of the plurality of fields shown in FIG. 7 in the RNR element are not limited.

Figure 8:
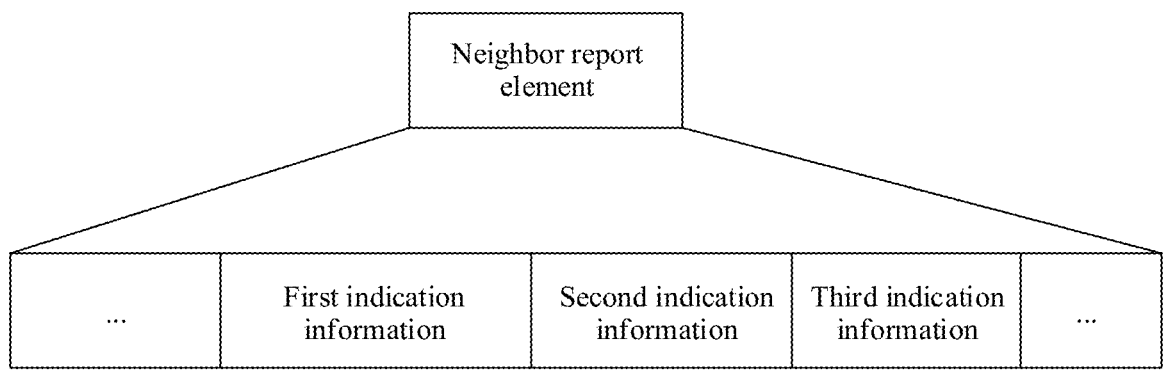
FIG. 8 is a schematic diagram of a neighbor report element according to an embodiment.

FIG. 8 is a schematic diagram of a neighbor report element according to an embodiment of this application. The neighbor report element may include one or more of a first indication information field, a second indication information field, and a third indication information field. Quantities of bits of the first indication information field, the second indication information field, and the third indication information field are not limited, and locations of the first indication information field, the second indication information field, and the third indication information field are not limited either. The quantity of bits may be 1 or 2. The neighbor report element may further include other fields. Optionally, a part represented by ellipses in FIG. 8 may include a plurality of fields shown in FIG. 9. The plurality of fields may include a channel number field and an operating class field. Optionally, the plurality of fields may further include an element ID field, a length field, and a basic service set ID (BSSID) field, a BSSID information field, an optional sub-elements field, and the like. The locations of the first indication information field, the second indication information field, the third indication information field, and locations of the plurality of fields shown in FIG. 9 in the neighbor report element are not limited.

The multi-band element (or the RNR element or the neighbor report element) is carried in the radio frame transmitted on the first link, and carries an identifier of the second link. The third station that receives the multi-band element on the first link may determine, based on the second link indicated by the multi-band element, the first indication information and/or the second indication information, whether the first station on the first link and the second station on the second link support simultaneous transmitting/receiving operations. In this way, the multi-band element (or the RNR element or the neighbor report element) of the first link may not be carried. This can reduce signaling overheads.

Optionally, the radio frame includes a newly-defined transmitting/receiving capability information element. The transmitting/receiving capability information element includes an element ID field, a length field, and a capability indication information field. The capability indication information includes a link identifier of the first link and the link identifier of the second link. The transmitting/receiving capability information element may indicate whether the first station and the second station support simultaneous transmitting/receiving operations, so that whether the first station operating on the first link and any station operating on another link in the first multi-link device support simultaneous transmitting/receiving operations can be indicated by using the transmitting/receiving capability information element, without a need to be indicated by using information elements one by one. This reduces signaling overheads.

Figures 9, 10:
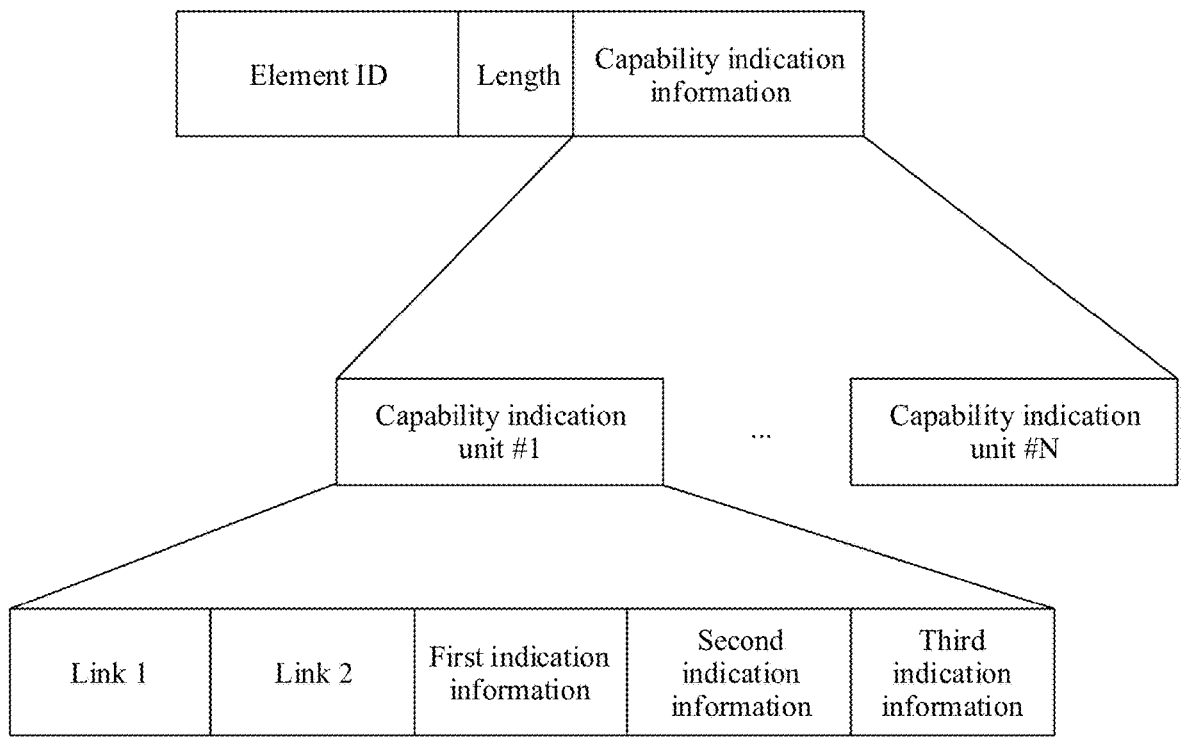
FIG. 9 is a schematic diagram of other fields included in a neighbor report element according to an embodiment.
FIG. 10 is a schematic diagram of a transmitting/receiving capability information element according to an embodiment.

For example, FIG. 10 is a schematic diagram of a transmitting/receiving capability information element according to an embodiment of this application. The transmitting/receiving capability information element may include an element ID field, an element length field, and a capability indication information field. The capability indication information field may further include N capability indication units, where N is an integer greater than or equal to 1. A capability indication unit may include two link identifiers that need to be indicated for the first multi-link device. For example, a capability indication unit #1 may include a link identifier of a link 1 and a link identifier of a link 2, indicating that a station operating on the link 1 and a station operating on the link 2 in the first multi-link device can support simultaneous transmitting/receiving operations. A capability indication unit #2 may include a link identifier of a link 3 and a link identifier of a link 4, indicating that a station operating on the link 3 and a station operating on the link 4 in the first multi-link device can support simultaneous transmitting/receiving operations. Functions of other capability indication units are similar. Details are not described in this embodiment of this application again. The link identifier may include a band ID (band ID), an operating class, a channel number, and the like. Optionally, the capability indication unit may further include one or more of first indication information, second indication information, third indication information, and the like. Functions of the first indication information, the second indication information, and the third indication information are described in detail above. Details are not described in this embodiment of this application again.

It should be noted that the capability indication information included in the radio frame transmitted by the first multi-link device may be used to indicate whether the first station operating on the first link and the second station operating on the second link support simultaneous transmitting/receiving operations. The capability indication information may also indicate whether the first station operating on the first link and a plurality of stations operating on a plurality of other links in the first multi-link device support simultaneous transmitting/receiving operations.

In this embodiment, the capability indication information is carried in the radio frame to indicate whether the first station operating on the first link and the second station operating on the second link in the first multi-link device support simultaneous transmitting/receiving operations. Another (third) station that receives the capability indication information can determine whether the first station and the second station in the first multi-link device can support simultaneous transmitting/receiving of data. If the first station and the second station support simultaneous transmitting/receiving of data, the third station may perform simultaneous transmitting/receiving with the first station and the second station, thereby improving communication efficiency. If the first station and the second station do not support simultaneous transmitting/receiving of data, the third station may avoid performing simultaneous transmitting/receiving with the first station and the second station, thereby ensuring communication quality.

Figure 11:
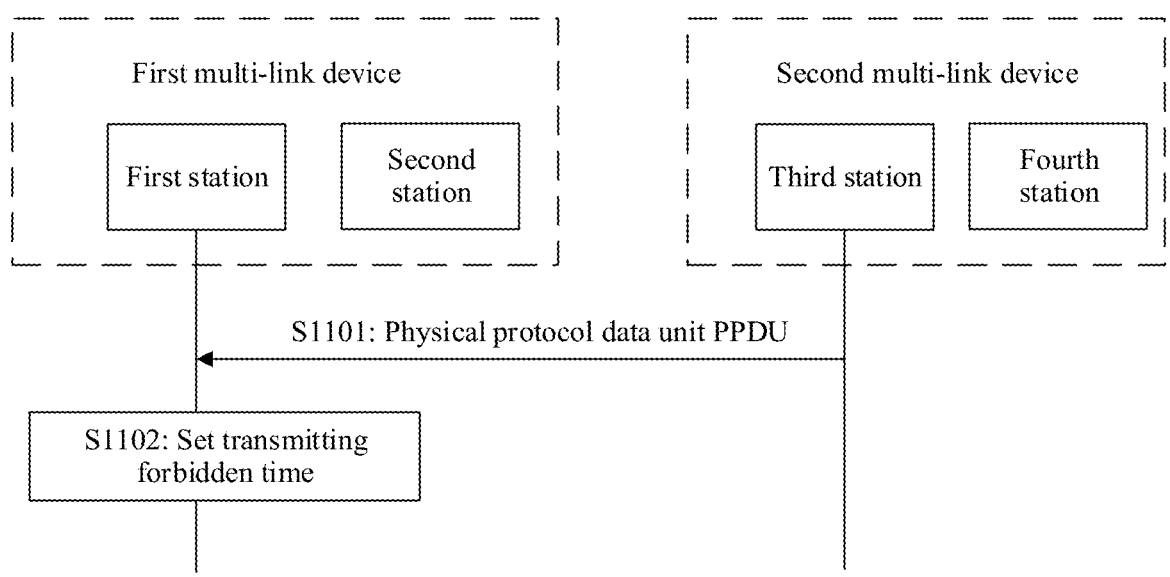
FIG. 11 is a schematic flowchart of another multi-link communication method according to an embodiment.

FIG. 11 is a schematic flowchart of another multi-link communication method according to an embodiment of this application. The method includes but is not limited to the following steps.

S1101: A second multi-link device transmits a physical protocol data unit (PPDU) to a first multi-link device on a primary link, and the first multi-link device receives, on the primary link, the PPDU transmitted by the second multi-link device, where there are a plurality of links between the first multi-link device and the second multi-link device, and the plurality of links include the primary link and a secondary link adjacent to the primary link.

In FIG. 11, the first multi-link device includes a first station and a second station, and the second multi-link device includes a third station and a fourth station. A link between the first station and the third station is the primary link, and a link between the second station and the fourth station is the secondary link. When the primary link and the secondary link are close to each other, if the first station and the second station in the first multi-link device simultaneously transmit and receive data, the secondary link causes interference and contention conflicts to data transmission on the primary link. It may be understood that the second multi-link device may not be a device operating on a multi-link, but a device operating on a single link, for example, the primary link.

S1102: The first multi-link device sets transmitting block-out time, where the transmitting block-out time indicates a period of time in which a station operating on the secondary link in the first multi-link device is prevented from transmitting data.

Optionally, when determining that the PPDU is transmitted to the first multi-link device, the first multi-link device may set the transmitting block-out time.

Specifically, the first station in the first multi-link device may first determine the transmitting block-out time, and then transmit a notification message to the second station, where the notification message includes the transmitting block-out time. After receiving the notification message, the second station sets the transmitting block-out time on the secondary link. The transmitting block-out time may alternatively be determined and set by a module in the first multi-link device. This is not limited herein. The transmitting block-out time includes a start time point and an end time point. Alternatively, the transmitting block-out time includes a start time point and a time length. The time length is calculated by subtracting the start time point from the end time point of the transmitting block-out time. Optionally, the time length is used to set a timer. For example, the second station may set a timer based on the time length, and before a value of the timer decreases to 0, the second station does not transmit data. In other words, when the first station of the first multi-link device receives data, the second station of the first multi-link device is prevented from transmitting data within a time window indicated by the transmitting block-out time.

In another possible implementation, transmitting block-out time on the secondary link includes only one time length, and the secondary link cannot transmit data within the time length. The time length may be calculated by subtracting a start point from an end point of the transmitting block-out time, and the time length is used to set a timer.

The start time point may be a time point in a physical layer preamble, for example, a time point at which a signaling field in the physical layer preamble is obtained. "Obtaining" may also be construed as receiving, parsing, or detecting. The start time point may alternatively be a time point at which that a receive address (RA) in a media access control MAC header in the PPDU matches an address of a station operating on the primary link is determined. The start time point may alternatively be a time point at which a frame check sequence (FCS) is received and a data packet is received correctly.

The end time point may be an end time point of the PPDU. The end time point may alternatively be an end time point at which the station operating on the primary link in the first multi-link device responds to a block acknowledgment (BA) of the PPDU. The end time point may alternatively be a time point at which the station operating on the primary link in the first multi-link device responds to the BA of the PPDU plus a short interframe space (SIFS). The end time point may alternatively be an end time point of a transmission opportunity (TXOP) to which the PPDU belongs.

Figure 12:
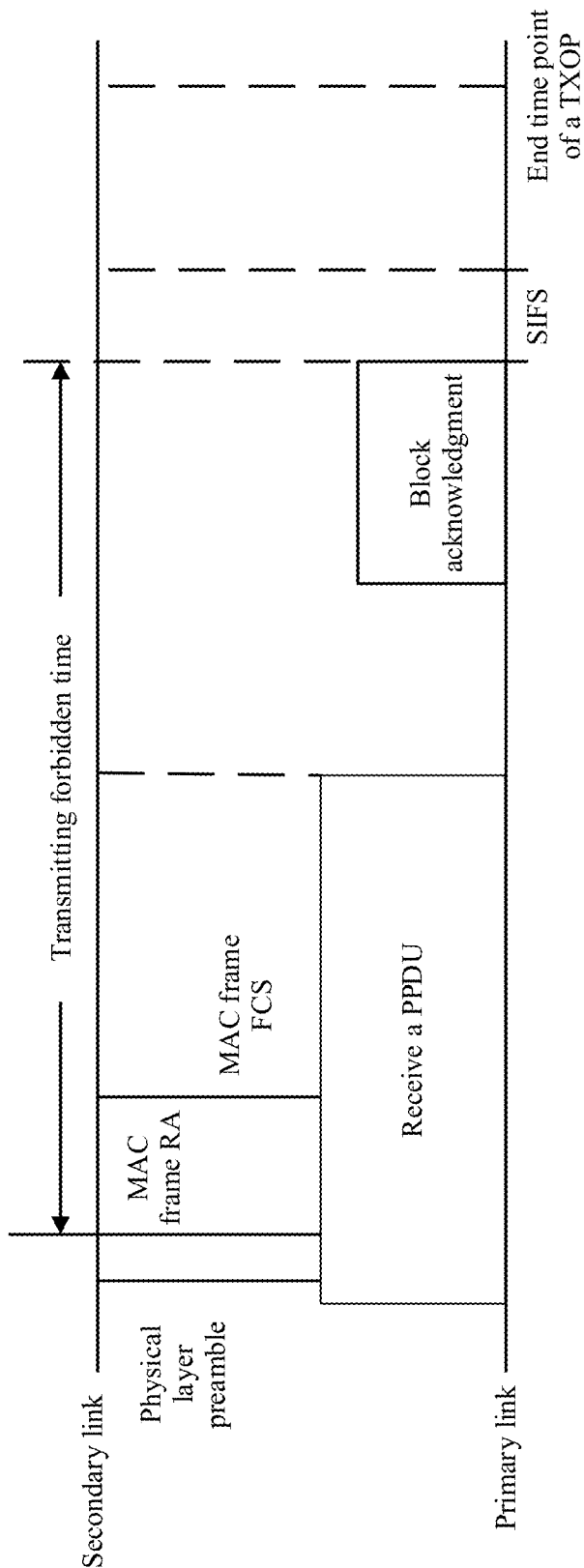
FIG. 12 is a schematic diagram of data transmission according to an embodiment.

FIG. 12 is a schematic diagram of data transmission according to an embodiment of this application. A first multi-link device receives, on a primary link, a PPDU transmitted by a second multi-link device. In the process of receiving the PPDU, there are three time points (represented by vertical solid lines in the figure) from left to right: a time point in a physical layer preamble, a time point at which that an RA in a MAC header in the PPDU matches an address of a station operating on the primary link is determined, and a time point at which an FCS is received and a data packet is received correctly. Any one of the time points may be used as a start time point of transmitting block-out time. After receiving the PPDU, the first multi-link device returns, on the primary link, a block acknowledgment BA to the second multi-link device. There are four time points (represented by vertical dotted lines in the figure) from receiving completion of the PPDU to an end of a TXOP from left to right: an end time point of the PPDU, an end time point of a block acknowledgment BA responding to the PPDU, a time point of the BA in response to the PPDU plus a short interframe space SIFS, and an end time point of the transmission opportunity TXOP to which the PPDU belongs. Any of the time points may be used as the end time point. For example, in the transmitting block-out time shown in FIG. 12, the time point at which that the RA in the MAC header in the PPDU matches the address of the station operating on the primary link is determined is used as the start time point, and the end time point at which the block acknowledgment BA in response to the PPDU is used as the end time point.

Optionally, when the secondary link is adjacent to a plurality of primary links, the plurality of primary links may participate in setting transmitting block-out time for the secondary link. One primary link corresponds to one transmitting block-out time. The start time point is a smallest start value of a plurality of transmitting block-out time corresponding to the plurality of primary links. The end time point is a largest end value of the plurality of transmitting block-out time corresponding to the plurality of primary links. The time length is a largest value of a plurality of time lengths corresponding to the plurality of primary links. Therefore, it is ensured that the transmitting block-out time set for the secondary link can meet requirements of the plurality of primary links, and no interference or no contention conflict is caused to all the primary links.

Optionally, when the secondary link is adjacent to a plurality of primary links, transmitting block-out time may be set for each primary link in the foregoing manner of setting the start time point and the end time point, and the plurality of transmitting block-out time is recorded on the secondary link. When receiving is performed on a primary link, a first multi-link station sets, on the secondary link, transmitting block-out time corresponding to the primary link, so that the transmitting block-out time is set more precisely for each primary link.

In this embodiment of this application, in multi-link aggregation (aggregation between the primary link and the secondary link) communication, data is prevented to be transmitted on the secondary link by setting the transmitting block-out time, to avoid simultaneous transmitting/receiving of data on adjacent links. This reduces interference and contention conflicts for the primary link.

The foregoing describes in detail the method in the embodiments of this application. The following provides apparatuses in the embodiments of this application.

Figure 13:
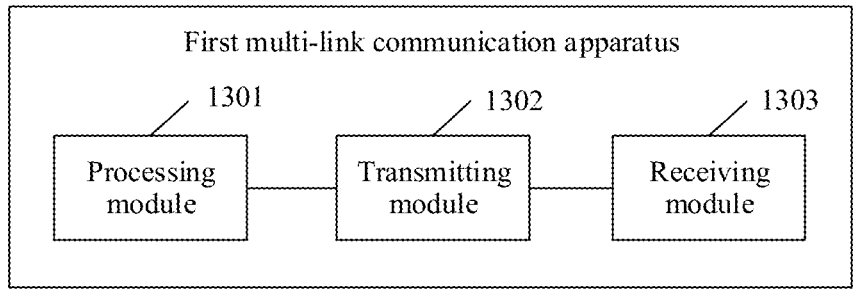
FIG. 13 is a schematic diagram depicting a structure of a first multi-link device according to an embodiment.

FIG. 13 is a schematic diagram depicting a structure of a first multi-link device according to an embodiment of this application. The first multi-link device may be configured to implement any method and function related to the first multi-link device in any of the foregoing embodiments. The first multi-link device may include a processing module 1301, a transmitting module 1302, and a receiving module 1303. Optionally, the transmitting module 1302 and the receiving module 1303 respectively correspond to a baseband circuit and a radio frequency circuit included in the first multi-link device. Detailed descriptions of the modules are as follows:

In an Embodiment:

the processing module 1301 is configured to generate a radio frame by using a first station, where the first station is one of a plurality of stations included in the first multi-link device, and the first multi-link device includes the first station operating on a first link and a second station operating on a second link;

the transmitting module 1302 is configured to transmit the radio frame on the first link by using the first station, where the radio frame includes capability indication information, and the capability indication information is used to indicate whether the first station and the second station support simultaneous transmitting/receiving operations; and the processing module 1301 and the transmitting module 1302 may be modules in the foregoing first station. For content and functions of elements or fields included in the radio frame, refer to descriptions in the foregoing method embodiments. Details are not described herein again.

In Another Embodiment:

the receiving module 1303 is configured to receive, on a primary link, a physical protocol data unit PPDU transmitted by a second multi-link device, where there is a plurality of links between the first multi-link device and the second multi-link device, and the plurality of links include the primary link and a secondary link adjacent to the primary link; and the processing module 1301 is configured to set transmitting block-out time, where the transmitting block-out time indicates a period of time in which a station operating on the secondary link in the first multi-link device is prevented from transmitting data.

For a method for determining and setting the transmitting block-out time, refer to descriptions in the foregoing method embodiments. Details are not described herein again.

It should be noted that, for implementation of the modules, refer to corresponding descriptions of the method embodiments shown in FIG. 3 and FIG. 11. The modules are configured to perform the method and the functions performed by the first multi-link device in the foregoing embodiment.

Figure 14:
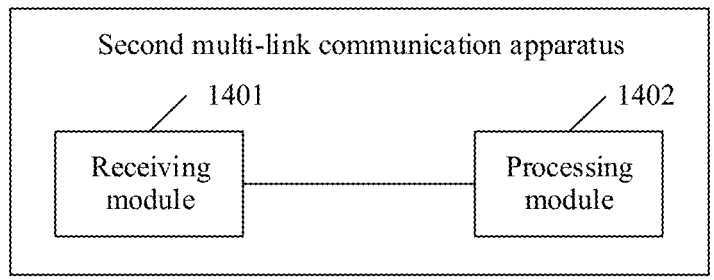
FIG. 14 is a schematic diagram depicting a structure of a second multi-link device according to an embodiment.

FIG. 14 is a schematic diagram depicting a structure of a second multi-link device according to an embodiment. The second multi-link device may be configured to implement any method and function related to the second multi-link device in any of the foregoing embodiments. The second multi-link device may include a receiving module 1401 and a processing module 1402. Optionally, the receiving module 1401 and the processing module 1402 may be modules in the foregoing described third station, and the receiving module 1401 corresponds to a baseband circuit included in the third station. Detailed descriptions of the modules are as follows.

The receiving module 1401 is configured to receive, by using the third station, a radio frame transmitted by a first station in a plurality of stations included in a first multi-link device. The first multi-link device includes the first station operating on a first link and a second station operating on a second link.

The radio frame includes capability indication information, and the capability indication information indicates whether the first station and the second station support simultaneous transmitting/receiving operations.

The processing module 1402 is configured to determine, by using the third station based on the capability indication information, whether the first station and the second station support simultaneous transmitting/receiving operations.

For content and functions of elements or fields included in the radio frame, refer to descriptions in the foregoing method embodiments. Details are not described herein again.

It should be noted that, for implementation of the modules, refer to corresponding descriptions of the method embodiments shown in FIG. 3 and FIG. 11. The modules are configured to perform the method and the functions performed by the second multi-link device in the foregoing embodiment.

Figure 15:
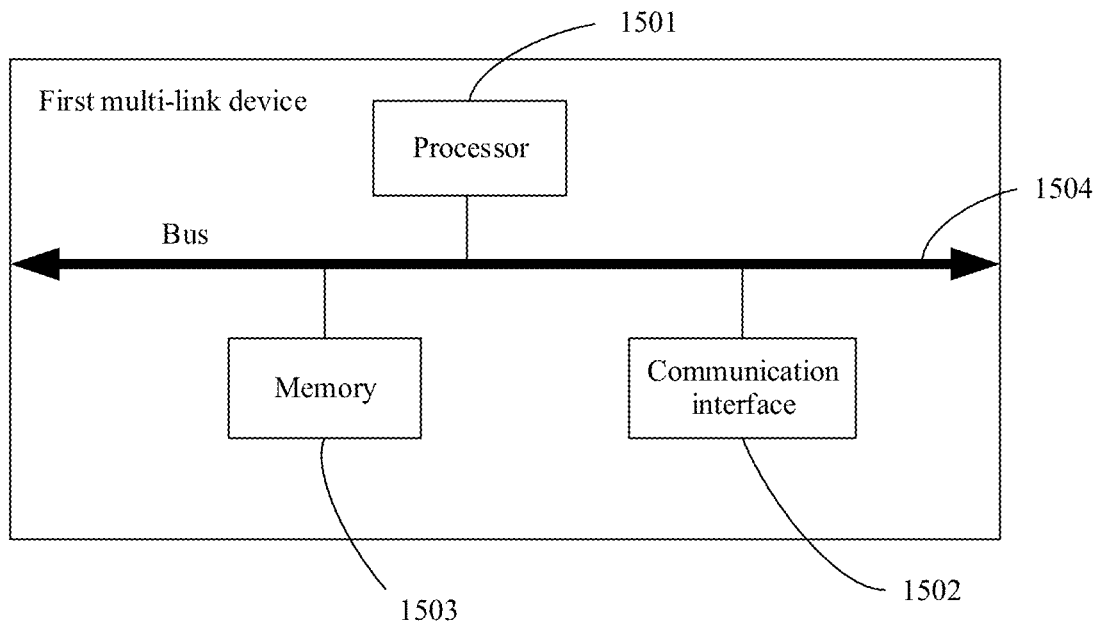
FIG. 15 is a schematic diagram depicting a structure of a first multi-link device according to an embodiment.

FIG. 15 is a schematic diagram depicting a structure of a first multi-link device according to an embodiment. As shown in FIG. 15, the first multi-link device may include at least one processor 1501, at least one communication interface 1502, at least one memory 1503, and at least one communication bus 1504.

The processor 1501 may be a central processing unit, a general-purpose processor, a digital signal processor, an application-specific integrated circuit, a field programmable gate array or another programmable logic device, a transistor logic device, a hardware component, or any combination thereof. The processor may implement or execute various examples of logical blocks, modules, and circuits described with reference to the content disclosed in this application. Alternatively, the processor may be a combination of processors implementing a computing function, for example, a combination of one or more microprocessors, or a combination of a digital signal processor and a microprocessor. The communication bus 1504 may be a peripheral component interconnect PCI bus, an extended industry standard architecture EISA bus, or the like. The bus may be classified into an address bus, a data bus, a control bus, and the like. For ease of representation, only one thick line is used to represent the bus in FIG. 15, but this does not mean that there is only one bus or only one type of bus. The communication bus 1504 is configured to implement connections and communication between these components. The communication interface 1502 in the device in this embodiment of this application is configured to perform signaling or data communication with another node device. The memory 1503 may include a volatile memory, for example, a nonvolatile random access memory (NVRAM), a phase-change random-access memory (phase-change RAM, PRAM), a magneto-resistive random-access memory (MRAM), or the like. The memory 1503 may further include a nonvolatile memory, for example, at least one magnetic disk storage device, an electrically erasable programmable read-only memory (EEPROM), a flash storage device such as a NOR flash memory or a NAND flash memory, or a semiconductor device such as a solid state disk (SSD). Optionally, the memory 1503 may be at least one storage apparatus far away from the processor 1501. Optionally, the memory 1503 may further store a group of program code. Optionally, the processor 1501 may further execute the program stored in the memory 1503.

In an embodiment, the processor 1501 is configured to perform the following operations:

generating a radio frame by using a first station, where the first station is one of a plurality of stations included in the first multi-link device, and the first multi-link device includes the first station operating on a first link and a second station operating on a second link; and transmitting the radio frame on the first link by using the first station, where the radio frame includes capability indication information, and the capability indication information is used to indicate whether the first station and the second station support simultaneous transmitting/receiving operations.

For content and functions of elements or fields included in the radio frame, refer to descriptions in the foregoing method embodiments. Details are not described herein again.

In another embodiment, the processor 1501 is configured to perform the following operations:

receiving, on a primary link, a physical protocol data unit PPDU transmitted by a second multi-link device, where there are a plurality of links between the first multi-link device and the second multi-link device, and the plurality of links include the primary link and a secondary link adjacent to the primary link; and setting transmitting block-out time, where the transmitting block-out time indicates a period of time in which a station operating on the secondary link in the first multi-link device is prevented from transmitting data.

For a method for determining and setting the transmitting block-out time, refer to descriptions in the foregoing method embodiments. Details are not described herein again.

Further, the processor may further perform the operations of the first multi-link device in the foregoing embodiments of this application by collaborating with the memory and the communication interface.

Figure 16:
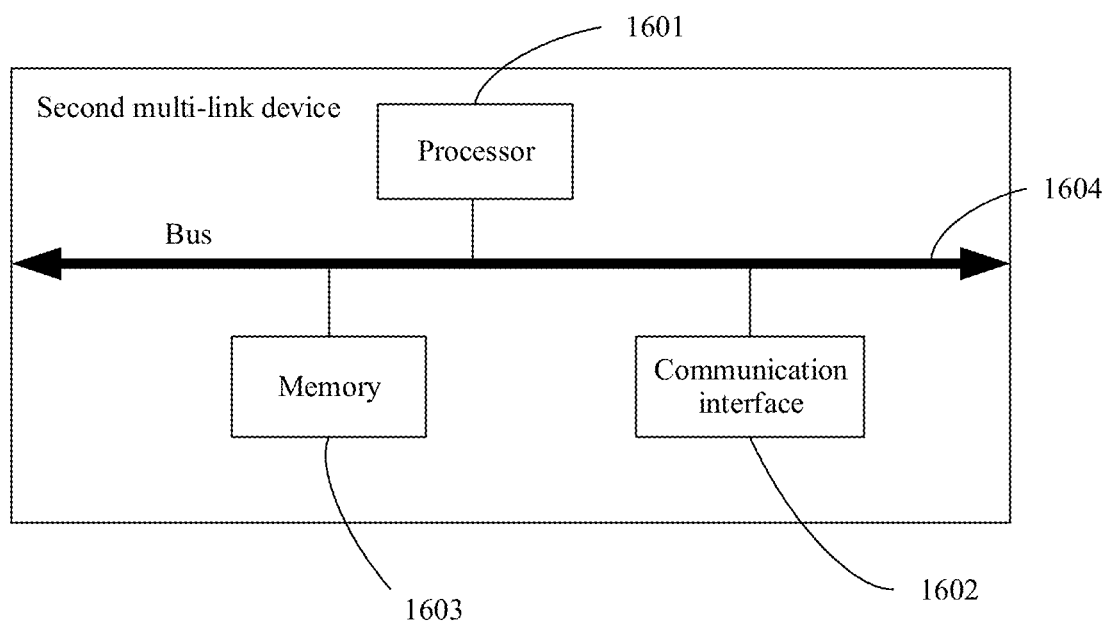
FIG. 16 is a schematic diagram depicting a structure of a second multi-link device according to an embodiment.

FIG. 16 is a schematic diagram depicting a structure of a second multi-link device according to an embodiment of this application. As shown in figure, the second multi-link device may include at least one processor 1601, at least one communication interface 1602, at least one memory 1603, and at least one communication bus 1604.

The processor 1601 may be the various types of processors described above. The communication bus 1604 may be a peripheral component interconnect PCI bus, an extended industry standard architecture EISA bus, or the like. The bus may be classified into an address bus, a data bus, a control bus, and the like. For ease of representation, only one thick line is used to represent the bus in FIG. 16, but this does not mean that there is only one bus or only one type of bus. The communication bus 1604 is configured to implement connections and communication between these components. The communication interface 1602 in the device in this embodiment of this application is configured to perform signaling or data communication with another node device. The memory 1603 may be the various types of memories described above. Optionally, the memory 1603 may be at least one storage apparatus far away from the processor 1601. The memory 1603 stores a group of program code, and the processor 1601 executes the program in the memory 1603.

The processor 1601 receives, by using a third station, a radio frame transmitted by a first station in a plurality of stations included in a first multi-link device. The first multi-link device includes the first station operating on a first link and a second station operating on a second link.

The radio frame includes capability indication information, and the capability indication information indicates whether the first station and the second station supports simultaneous transmitting/receiving operations.

The processor 1601 determines, by using the third station based on the capability indication information, whether the first station and the second station support simultaneous transmitting/receiving operations.

For content and functions of elements or fields included in the radio frame, refer to descriptions in the foregoing method embodiments. Details are not described herein again.

Further, the processor may further perform the operations of the second multi-link device in the foregoing embodiments of this application by collaborating with the memory and the communication interface.

An embodiment further provides a chip system. The chip system includes a processor, configured to support a first multi-link device or a second multi-link device to implement a function in any one of the foregoing embodiments, for example, to generate or process data and/or information in the foregoing method. In a possible design, the chip system may further include a memory. The memory is used store program instructions and data that are necessary for the first multi-link device or the second multi-link device. The chip system may include a chip, or may include a chip and another discrete component.

An embodiment further provides a processor, coupled to a memory. The processor is configured to perform any method and function related to the first multi-link device or the second multi-link device in any one of the foregoing embodiments.

An embodiment further provides a computer program product including instructions. When the computer program product runs on a computer, the computer performs any method and function related to the first multi-link device or the second multi-link device in any one of the foregoing embodiments.

An embodiment further provides an apparatus. The apparatus is configured to perform any method and function related to the first multi-link device or the second multi-link device in any one of the foregoing embodiments.

An embodiment further provides a wireless communication system. The system includes at least one first multi-link device and at least one second multi-link device in any one of the foregoing embodiments.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The objectives, technical solutions, and beneficial effects of this application are further described in detail in the foregoing specific implementations. Any modification, equivalent replacement, or improvement made without departing from the spirit and principle of this application shall fall within the protection scope of this application.

What is claimed is:

1. A multi-link communication method, comprising:
generating, by a first multi-link device, a radio frame, the first multi-link device comprising a first station operating on a first link and a second station operating on a second link; and
transmitting, by the first multi-link device, the radio frame on the first link, the radio frame comprising an information element including first indication information indicating whether the first station and the second station support simultaneous transmitting and/or receiving operations and second indication information comprising a threshold indicating a minimum value of a difference between operating frequencies of two links that support the simultaneous transmitting and/or receiving operations.

2. The method according to claim 1, wherein the simultaneous transmitting and/or receiving operations comprise a first operation and a second operation, the first operation being that the second station performs a receiving operation while the first station performs a transmitting operation and the second operation being that the second station performs a transmitting operation while the first station performs a receiving operation.

3. The method according to claim 2, wherein the first indication information comprises 1-bit information indicating whether both the first station and the second station support the first operation and the second operation.

4. The method according to claim 2, wherein the first indication information comprises 2-bit information, first-bit information in the 2-bit information indicating whether the first station and the second station support the first operation and second-bit information in the 2-bit information indicating whether the first station and the second station support the second operation.

5. The method according to claim 1, wherein the first indication information comprises a plurality of pieces of 1-bit information or a plurality of pieces of 2-bit information, one piece of 1-bit information or one piece of 2-bit information indicating whether the first station using a first bandwidth and the second station using a second bandwidth support simultaneous transmitting/receiving operations.

6. The method according to claim 1, wherein the first multi-link device comprises at least one multi-link logical entity including at least one station and the information element comprises third indication information indicating whether the first station and the second station are located in a same multi-link logical entity.

7. The method according to claim 1, wherein the information element comprises identification information of the second link and includes
a multi-band element, a reduced neighbor report element, or a neighbor report element.

8. The method according to claim 1, wherein the radio frame comprises a transmitting and/or receiving capability information element including an element ID, an element length, and capability indication information including a link identifier of the first link and a link identifier of the second link.

9. A multi-link communication method, comprising:
receiving, by a third station, a radio frame transmitted by a first multi-link device, wherein the first multi-link device comprises a first station operating on a first link and a second station operating on a second link, wherein:
the radio frame comprises an information element including first indication information indicating whether the first station and the second station support simultaneous transmitting and/or receiving operations and second indication information comprising a threshold indicating a minimum value of a difference between operating frequencies of two links that support the simultaneous transmitting and/or receiving operations; and
determining, by the third station based on the first indication information, whether the first station and the second station support simultaneous transmitting and/or receiving operations.

10. The method according to claim 9, wherein the simultaneous transmitting/receiving operations comprise a first operation and a second operation, the first operation being that the second station performs a receiving operation while the first station performs a transmitting operation and the second operation being that the second station performs a transmitting operation while the first station performs a receiving operation.

11. The method according to claim 10, wherein the first indication information comprises 1-bit information indicating whether both the first station and the second station support the first operation and the second operation.

12. The method according to claim 10, wherein the first indication information comprises 2-bit information, first-bit information in the 2-bit information indicating whether the first station and the second station support the first operation and second-bit information in the 2-bit information indicating whether the first station and the second station support the second operation.

13. The method according to claim 9, wherein the first indication information comprises a plurality of pieces of 1-bit information or a plurality of pieces of 2-bit information, one piece of 1-bit information or one piece of 2-bit information indicating whether the first station using a first bandwidth and the second station using a second bandwidth support simultaneous transmitting/receiving operations.

14. A multi-link device, used on a first station side, wherein the first multi-link device comprises:
a nonvolatile memory storage comprising instructions; and
one or more processors in communication with the memory, wherein execution of the instructions by the one or more processors causes the multi-link device to:
generate a radio frame, the multi-link device comprising a first station operating on a first link and a second station operating on a second link; and
transmit the radio frame on the first link, the radio frame comprising an information element comprising first indication information indicating whether the first station and the second station support simultaneous transmitting/receiving operations and second indication information including a threshold indicating a minimum value of a difference between operating frequencies of two links that support the simultaneous transmitting and/or receiving operations.

15. The apparatus according to claim 14, wherein the simultaneous transmitting and/or receiving operations comprise a first operation and a second operation, the first operation providing that the second station performs a receiving operation while the first station performs a transmitting operation and the second operation providing that the second station performs a transmitting operation while the first station performs a receiving operation.

16. The apparatus according to claim 14, wherein the first indication information comprises 1-bit information indicating whether both the first station and the second station support the first operation and the second operation.

17. The apparatus according to claim 14, wherein the first indication information comprises 2-bit information, first-bit information in the 2 bit information indicating whether the first station and the second station support the first operation and second-bit information in the 2-bit information indicating whether the first station and the second station support the second operation.

18. The apparatus according to claim 14, wherein the first indication information comprises a plurality of pieces of 1-bit information or a plurality of pieces of 2-bit information, one piece of 1-bit information or one piece of 2-bit information indicating whether the first station using a first bandwidth and the second station using a second bandwidth support simultaneous transmitting/receiving operations.

19. The apparatus according to claim 15, wherein the first multi-link device comprises at least one multi-link logical entity including at least one station and the information element comprises third indication information indicating whether the first station and the second station are located in a same multi-link logical entity.

20. The apparatus according to claim 14, wherein the information element comprises identification information of the second link and includes a multi-band element, a reduced neighbor report element, or a neighbor report element.

21. The apparatus according to claim 14, wherein the radio frame comprises a transmitting and/or receiving capability information element including an element ID, an element length, and capability indication information including a link identifier of the first link and a link identifier of the second link.

22. A multi-link device, comprising:
a nonvolatile memory storage comprising instructions; and
one or more processors in communication with the memory, wherein the instructions, upon execution by the one or more processors, cause the device to:
receive a radio frame transmitted by a first multi-link device, wherein the first multi-link device comprises a first station operating on a first link and a second station operating on a second link, wherein:
the radio frame comprises an information element including first indication information indicating whether the first station and the second station support simultaneous transmitting and/or receiving operations and second indication information including a threshold indicating a minimum value of a difference between operating frequencies of two links that support the simultaneous transmitting and/or receiving operations; and
determine, by using a third station based on the first indication information, whether the first station and the second station support simultaneous transmitting and/or receiving operations.

23. The apparatus according to claim 22, wherein the simultaneous transmitting and/or receiving operations comprise a first operation and a second operation, the first operation providing that the second station performs a receiving operation while the first station performs a transmitting operation and the second operation providing that the second station performs a transmitting operation while the first station performs a receiving operation.

24. The apparatus according to claim 22, wherein the first indication information comprises 1-bit information indicating whether both the first station and the second station support the first operation and the second operation.

25. The apparatus according to claim 22, wherein the first indication information comprises 2-bit information, first-bit information in the 2-bit information indicating whether the first station and the second station support the first operation and second-bit information in the 2-bit information indicating whether the first station and the second station support the second operation.

26. The apparatus according to claim 22, wherein the first indication information comprises a plurality of pieces of 1-bit information or a plurality of pieces of 2-bit information, one piece of 1-bit information or one piece of 2-bit information indicating whether the first station using a first bandwidth and the second station using a second bandwidth support simultaneous transmitting and/or receiving operations.

* * * * *